Oct. 16, 1951
C. W. BONDURANT
2,571,667
RELIEF VALVE
Filed Jan. 29, 1945
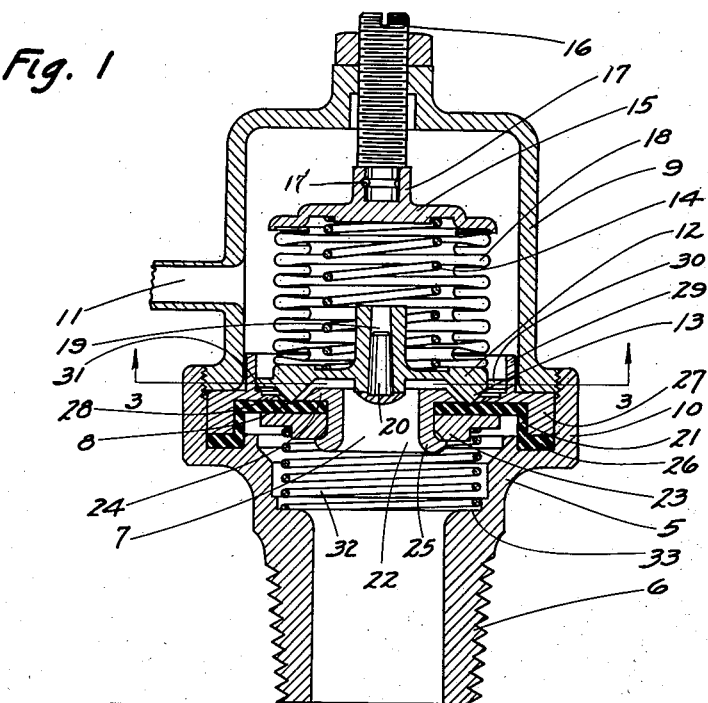
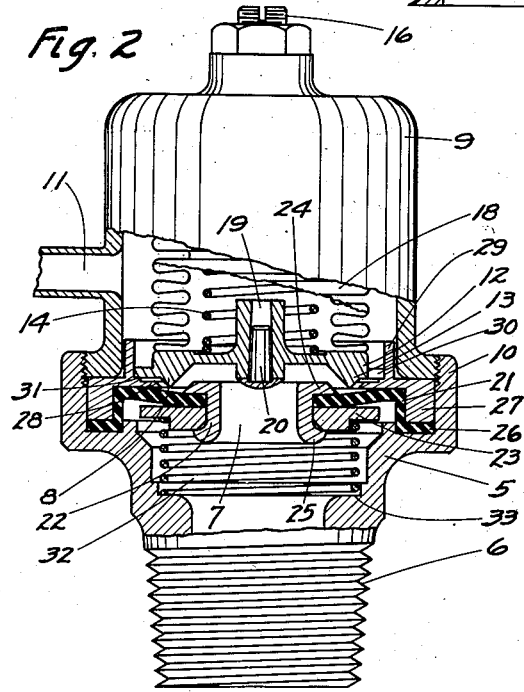
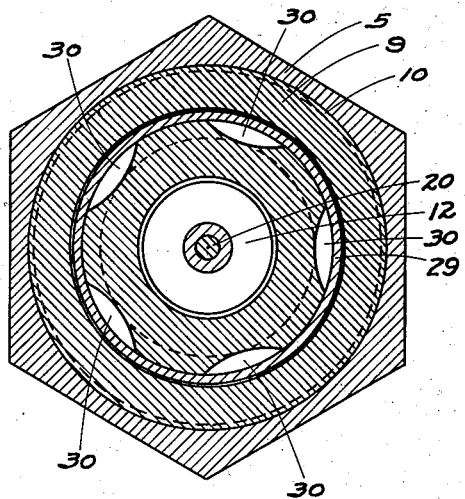
INVENTOR.
CARLTON W. BONDURANT
BY
ATTORNEY Patented Oct. 16, 1951

2,571,667

UNITED STATES PATENT OFFICE 2,571,667

RELIEF VALVE

Carlton W. Bondurant, Dayton, Ohio, assignor to Standard-Thomson Corporation, a corporation of Delaware Application January 29, 1945, Serial No. 575,048

3 Claims. (Cl. 277—45)

1

This invention relates to a relief valve and is designed more particularly for use on the storage tank of a liquid cooling system for the engine of an airplane, but is not limited to such use. The present application is a continuation in part of my pending application Serial No. 479,035, filed March 13, 1943, now Patent Number 2,431,457 issued November 2, 1947.

The ordinary relief valve is subject to atmospheric pressure and the tank pressure at which it opens varies with variations in atmospheric pressure. Atmospheric pressure decreases as altitude increases and the rate of decrease is not uniform but the rate increases as the altitude increases, for example the decrease in atmospheric pressure between altitudes of 20,000 feet and 25,000 feet is much greater than the decrease between altitudes of 5,000 feet and 10,000 feet.

One object of the invention is to provide a relief valve which will open under the same tank pressure at all altitudes.

A further object of the invention is to provide a relief valve which will not be affected by variations in atmoshperic pressure or temperature and will open at the same tank pressure regardless of such variations.

A further object of the invention is to provide such a relief valve which will automatically admit air to the tank in the event tank pressure falls substantially below atmospheric pressure at any altitude.

A further object of the invention is to provide such a relief valve which will be simple in construction, reliable in operation and which can be produced at a low cost.

A further object of the invention is to provide such a relief valve which may be so adjusted that tank pressure will be maintained substantially at the pressure of the ambient atmosphere until a predetermined altitude has been reached and at altitudes above said predetermined altitude tank pressure will be maintained substantially at the pressure of the atmospher at said predetermined altitude.

Other objects of the invention will appear as the deivce is described in detail.

In the accompanying drawings Fig. 1 is a sectional view taken centrally through a relief valve embodying my invention and showing the valve members in their normally closed positions; Fig. 2 is a similar section, partly in elevation, showing the valve seat displaced to admit atmospheric air to the tank; and Fig. 3 is a transverse section taken on the line 3—3 of Fig. 1.

In these drawings I have illustrated one em-

2 bodiment of my invention and have shown the same as designed primarily for attachment to the supply tank of a liquid cooling system for an airplane engine, but it is to be understood that the invention may take various forms and may be used in connection with various apparatus in which pressure relief is desirable. The term "tank" as herein used, is intended to include any receptacle or conduit adapted to contain fluid under pressure.

In that embodiment here illustrated the valve comprises a lower tubular structure 5 having means, such as a screw threaded nipple 6, whereby it may be connected with the tank and placed in communication with the interior thereof. This lower structure also includes a port 7, through which fluid may escape when the pressure in the tank becomes excessive, and a valve seat 8. The valve also includes an upper structure adapted to support certain parts of the valve and, in the present instance, to enclose parts of the mechanism and protect the same from injury. For that purpose the upper structure is here shown as an inverted cup-shaped member 9 having a screw threaded lower portion by which it is connected with a screw threaded flange 10 forming a part of the lower structure. It is also provided with an opening to connect the same with the atmosphere, here shown as a portion of a tube 11. Arranged within the casing formed by the lower and upper structures is a movable valve member 12 which is yieldably urged into sealing contact with the valve seat 8. The valve member and the valve seat may be of any suitable construction but for a purpose which will hereinafter appear it is desirable that one of these members should be provided with a relatively narrow contact edge to engage the other member so as to sharply define the area of the lower surface of the valve member which is subject to tank pressure when the valve is closed. In that embodiment shown in the above mentioned application the valve seat is shown as of hard material and as having a cross sectional shape of an inverted V, the valve member being provided with a sealing member of relatively soft material having a flat surface to engage the annular sharp edge valve seat. In the construction here shown the valve seat is preferably formed of more or less yieldable material, such as rubber of sufficient softness to permit the valve member to have tight sealing engagement therewith, and the valve member is provided with a lower annular contact portion 13 of substantially V-shape in cross section and adapted to engage the valve seat. It is to be noted that the terms "upper" and "lower" are herein used for convenience in referring to the drawings and that the valve may be mounted in any suitable position without materially affecting the operation thereof.

The valve member may be urged into engagement with the valve seat by any suitable means which will prevent it from opening until the tank pressure exceeds a predetermined limit. Preferably a coiled spring 14 is confined between the upper, or outer, surface of the valve member and a supporting member, or head 15, which is connected with and normally held against movement by the upper structure 9. The head is here shown as approximately disk-like in formation and is connected with the structure 9 by an adjusting member 16 which is screw threaded into the upper part of that structure and is connected with the head 15 for rotation with relation thereto and is held against axial movement with relation thereto. In the arrangement shown the inner end of the member 16 extends into a hollow boss 17 on the head and is secured therein by a pin 17' extending through a circumferential groove in the member 16. Thus the member 16 serves as an adjusting device whereby the compression of the spring 14 may be varied to cause the valve to open at a selected tank pressure. When the valve is to operate at approximately sea level, or continuously at any given altitude, the spring may be adjusted to provide for the opening of the valve, at that altitude, at the desired tank pressure and there will be little variation in its operation. However, when the outer surface of the valve member is subjected to atmospheric pressure that pressure provides part of the resistance to the opening movement of the valve member under tank pressure. Consequently an increase or decrease in atmospheric pressure modifies the total resistance offered to the opening movement of the valve member and the latter will open under different tank pressures at different altitudes. To prevent the valve member from opening under different tank pressures at different altitudes I have provided means for preventing atmospheric pressure from acting on the valve member, so that the resistance offered by the spring and by the bellows itself constitutes the whole of the resistance to the opening of the valve member and that resistance therefore remains constant. For this purpose I have so enclosed the central portion of the upper surface of the valve member that it will not be subject to atmospheric pressure, the portion so enclosed being of an area substantially equal to the area of that portion of the lower surface of the valve member which is subject to tank pressure when the valve member is in its closed position. The enclosure is preferably in the form of a hermetically sealed extensible housing enclosing the spring as well as a portion of the outer surface of the valve member. In the preferred construction the housing is in the form of a cylindrical bellows 18, of the type sold under the name "Sylphon," and this bellows is connected at its respective ends with the valve member 12 and the head 15, the connections being tightly sealed, as by solder, and the head forming a part of the housing. The bellows is substantially concentric with the axis of the valve seat and the effective diameter thereof, as defined by median lines extending through the folds thereof, is substantially equal to the diameter of the annular seat engaging edge of the valve member. Consequently that portion of the outer surface of the valve member which is enclosed by the bellows has an effective area substantially equal to the area of that portion of the inner surface of the valve member which is subjected to tank pressure. The exterior surface of the housing and the exposed parts of the valve member are such that the atmospheric pressure thereon is substantially equalized and balanced out. Therefore atmospheric pressure has no effect whatever upon the movement of the valve member from its closed position and that member will open at all altitudes under a tank pressure sufficient to compress the spring 14 and bellows.

In some installations it may be desirable for the valve to open at high altitudes at a tank pressure slightly different from the tank pressure under which it normally opens. This may be accomplished, without otherwise changing the apparatus, by increasing or decreasing the diameter of the annular contact edge of the valve member and thus increasing or decreasing the effective area of the valve member which is exposed to tank pressure only, when in its closed position.

Should the bellows 18 contain air or other fluid the opening movement of the valve member would compress the air within the bellows and thus increase the resistance to the opening of the valve member beyond the resistance offered by the spring alone. Further, any air contained in the bellows would contract and expand under the influence of changes in temperature, such as occur in changing altitudes, and the additional resistance thus offered to the opening movement of the valve member would vary in accordance with variations in atmospheric temperature. It is therefore desirable that the bellows should be as free as possible from fluid of any kind and this is accomplished by substantially evacuating all fluid from the bellows, that is, removing the fluid to as great an extent as is practical. To permit this to be done I have, in the present instance, provided the valve member 12 with an opening 19 through which the air may be evacuated and which may be then closed by inserting therein a plug 20 and tightly sealing the same, as by soldering. Thus the action of the valve member is in no way affected by changes either in atmospheric pressure or in temperature.

Under some conditions of operation the pressure in the tank of the cooling system may fall so far below atmospheric pressure as to endanger the tank or other parts of the system. To avoid this danger the relief valve is provided with means for automatically admitting air to the tank when the pressure within the tank falls substantially below atmospheric pressure at any altitude. This may be accomplished in various ways and in the present construction the valve seat is so supported that it will be retained in its normal operative position, for engagement with the valve member, by tank pressure acting thereon and when the tank pressure falls substantially below atmospheric pressure the valve seat will be displaced by atmospheric pressure to permit air to flow past the contact edge of the valve member and through the port into the tank. As here shown, the valve seat is a part of an annular member 21 which is yieldably supported in the lower structure of the valve. The outer edge of the annular member is secured to the wall of the structure and the inner edge thereof is free to move and thus permit the valve seat to move with relation to the valve member. The port 7 may be provided in any suitable manner and it is here shown as comprising an opening in a short tubular member 22 which is separate from the lower structure 5 and is connected with the inner edge of the yieldable member 21 for movement therewith. The lower surface of the yieldable member 21 is preferably supported by a rigid annular member 23 and in the arrangement shown the port member 22 has at its upper end an outwardly extending flange 24 engaging the inner portion of the upper surface of the yieldable member 21 and has its lower end 25 upset against the lower surface of the rigid member 23 to rigidly connect the yieldable member 21 with the port member and the supporting member, for movement in unison. The yieldable member 21 may be connected with the structure 5 in any suitable manner, in the present arrangement the upper part of the structure 5, which carries the flange 10, is of an enlarged diameter and the yieldable member is approximately Z-shaped in cross section and the lower radial portion 26 thereof is seated in a recess adjacent the lower edge of the flange 10 and is tightly clamped therein by an annular member 27 which is movably supported within the flange, and is held in clamping engagement with the edge portion of the yieldable member by the lower edge of the upper member 9. The intermediate portion of the yieldable member extends upwardly along the inner side of the clamping member and the upper radial portion thereof extends inwardly for connection with the port member as described. The clamping member is provided with a part or flange 28 which extends inwardly in contact with the upper surface of the yieldable member 21 to a line adjacent to but spaced some distance from the line on which the valve member engages the valve seat. The clamping member 27 also has a vertical flange 29 which extends upwardly about the valve member 12 and forms a guide therefor. That portion of the valve member which extends radially outward beyond the seat engaging portion thereof is provided with recesses 30 to connect the space between the flange 28 and the seat engaging portion 13 of the valve member with the atmosphere, thereby subjecting the yieldable member 21 at all times to atmospheric pressure. Thus the yieldable member 21, and that part thereof forming a valve seat, are held by tank pressure in a normally operative position which is predetermined by the flange 28 which limits the upward movement of the yieldable member. Should the tank pressure fall substantially below atmospheric pressure the pressure on the upper surface of the yieldable member will depress the same sufficiently to permit air to pass between the yieldable member and the contact edge of the valve member and through the port 7 to the tank. To prevent the valve member from moving downwardly with the valve seat and thus either preventing or retarding the entrance of air into the tank the movement of the valve member in port closing direction is limited, as by a shoulder 31 formed on the clamping member 27 and so located that the valve member may move downwardly into firm contact with the valve seat but will have no appreciable further movement when the valve seat is depressed.

To prevent the flexible structure, that is, the member 21, the port member 22 and the supporting member 23, from moving away from the valve member when the tank is under low pressure or under no pressure, I have provided means for yieldably supporting the structure with the valve seat in its normal predetermined position when the pressure in the tank is insufficient to support the weight of the yieldable structure. This means preferably comprises a spring 32 interposed between the yieldable structure and a shoulder 33 in the lower structure 5. The spring may be of just sufficient strength to support the weight of the yieldable structure and thus offer very little resistance to the depression of the valve seat by atmospheric pressure, or it may be of such strength as to prevent the depression of the valve seat by atmospheric pressure until the pressure in the tank has fallen a desired amount below atmospheric pressure.

In addition to accomplishing the purposes above set forth the yieldable valve seat causes a quick opening and closing of the valve, thereby avoiding the seepage between the valve seat and the valve member such as results from a gradual opening or closing of the valve. The initial opening movement of the valve member 12 permits a flow of air under tank pressure about the contact edge thereof and this air exerts pressure on the exposed upper surface of the yieldable member 21 and this pressure, in addition to atmospheric pressure, moves the valve seat downwardly simultaneously with the upward movement of the valve member, thus quickly completing the opening movement of the valve. The yieldable member is retained in its depressed position during the venting of the tank and as the valve member closely approaches the valve seat, on its closing movement, the pressure on the upper surface of the yieldable member is so reduced that tank pressure will move the yieldable member upwardly, thus quickly closing the valve.

It is sometimes desirable to maintain tank pressure at the pressure of the ambient atmosphere until a predetermined altitude is reached and to then, at higher altitudes, maintain tank pressure at the pressure of the atmosphere at said predetermined altitude regardless of changes in the pressure of the ambient atmosphere. By adjusting the screw 16 the bellows may be moved upwardly such a distance that the spring will not overcome the pressure of the ambient atmosphere on the valve member sufficiently to seat the latter until the predetermined altitude, say twenty thousand feet, has been reached. Thus the tank pressure will be the same as the pressure of the ambient atmosphere until an altitude of twenty thousand feet is reached, at which time the valve will be closed and will function at all higher altitudes to maintain the tank pressure at the equivalent of atmospheric pressure at twenty thousand feet.

While I have shown and described one embodiment of my invention, I wish it to be understood that I do not desire to be limited to the details thereof as various modifications may occur to a person skilled in the art.

Having now fully described my invention, what I claim as new and desire to secure by Letters Patent, is:

1. In a relief valve comprising a tubular structure having means whereby it may be attached to a tank containing fluid under pressure, an annular element of flexible material, the outer portion of which is secured to said structure and the inner portion of which is free to move with relation to said outer portion and has a part forming a valve seat, the central opening in said annular element constituting a port, said inner portion of said annular element being subjected to tank pressure to retain said valve seat normally in a predetermined position, a movable valve member to engage said valve seat when the latter is in said predetermined position and close said port, yieldable means for moving said valve member in port closing direction, said inner portion of said annular element also being subjected to atmospheric pressure to move said valve seat out of engagement with said valve member when said atmospheric pressure materially exceeds tank pressure.

2. In a relief valve having means whereby it may be attached to a tank containing fluid under pressure and having a port leading from said tank, an annular member of flexible material extending about said port, having one edge secured in a fixed position and its other edge free to move, and also having a part forming a valve seat, said member being so arranged that the tank pressure tends to normally move said valve seat upwardly, a downwardly urged valve member to engage the upper surface of said valve seat, means other than said valve member to limit the upward movement of said valve seat, the upper surface of said flexible member being exposed to atmospheric pressure which tends to move said valve seat downwardly when atmospheric pressure exceeds tank pressure, and means to so limit the downward movement of said valve member that said downward movement of said valve seat will separate the latter from said valve member.

3. A relief valve comprising a structure having a port to communicate with a source of fluid under pressure and also having a valve seat of yieldable material extending about said port, a movable valve member having a downwardly extending annular part of rigid material to engage said valve seat, spring means for moving said valve member into engagement with and retaining the same on said valve seat, a hermetically sealed bellows concentric with the axis of said valve seat, having at its upper end a stationary closure and having its lower end secured directly to the upper surface of said valve member, and having an effective diameter substantially equal to the diameter of that portion of said valve member which is within said downwardly extending part of the latter, whereby atmospheric pressures on said bellows and said valve member are substantially balanced when said valve is closed and the movement of said valve member in port opening direction is resisted solely by said spring means and said bellows.

CARLTON W. BONDURANT.

REFERENCES CITED

The following references are of record in the file of this patent:

UNITED STATES PATENTS

| Number | Name | Date |
|---|---|---|
| 122,756 | Camerer | Jan. 16, 1872 |
| 1,138,278 | Castle | May 4, 1915 |
| 1,891,119 | Stover | Dec. 13, 1932 |
| 1,981,965 | Morgan | Nov. 27, 1934 |
| 2,047,722 | Work | July 14, 1936 |
| 2,290,059 | Martin-Hurst | July 14, 1942 |
| 2,317,427 | Worth | Apr. 27, 1943 |
| 2,345,547 | Roth | Mar. 28, 1944 |
| 2,366,146 | Martin-Hurst | Dec. 26, 1944 |
| 2,437,187 | Eshbaugh | Mar. 2, 1948 |